United States Patent
Ma (10) Patent No.: US 12,524,288 B2
(45) Date of Patent: Jan. 13, 2026

(54) PROCESSING METHOD, APPARATUS, AND SYSTEM FOR BRUTE FORCE HOT UNPLUG OPERATION ON SOLID STATE DISK, AND MEDIUM

(71) Applicant: INSPUR SUZHOU INTELLIGENT TECHNOLOGY CO., LTD., Jiangsu (CN)

(72) Inventor: Jingbin Ma, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 331 days.

(21) Appl. No.: 18/265,404

(22) PCT Filed: Sep. 28, 2021

(86) PCT No.: PCT/CN2021/121413
§ 371 (c)(1),
(2) Date: Jun. 5, 2023

(87) PCT Pub. No.: WO2022/148070
PCT Pub. Date: Jul. 14, 2022

(65) Prior Publication Data
US 2024/0045748 A1     Feb. 8, 2024

(30) Foreign Application Priority Data
Jan. 7, 2021   (CN) .......................... 202110018520.5

(51) Int. Cl.
*G06F 11/07*   (2006.01)
*G06F 11/14*   (2006.01)
(Continued)

(52) U.S. Cl.
CPC ........ *G06F 11/0727* (2013.01); *G06F 11/141* (2013.01); *G06F 13/24* (2013.01); *G06F 13/4081* (2013.01)

(58) Field of Classification Search
CPC .... G06F 11/0727; G06F 11/141; G06F 13/24; G06F 13/4081
See application file for complete search history.

(56) References Cited

U.S. PATENT DOCUMENTS 10,467,163 B1 *  11/2019  Malwankar ........... G06F 3/0655
2012/0221870 A1 *  8/2012  Zhao .................... G06F 1/3218
                                                                713/320

FOREIGN PATENT DOCUMENTS

CN    107203448 A    9/2017
CN    108323217 A    7/2018
(Continued)

OTHER PUBLICATIONS

Corresponding International Patent Application No. PCT/CN2021/121413, International Search Report, Date Mailed Dec. 30, 2021.
(Continued)

*Primary Examiner* — Bryce P Bonzo
*Assistant Examiner* — Audrey Emma Whitesell
(74) *Attorney, Agent, or Firm* — Cooper Legal Group, LLC (57) ABSTRACT

The present application discloses a processing method for a brute force hot unplug operation on a U.2 NVMe solid-state disk, including: predefining a short signal pin for detecting whether an NVMe solid-state disk is in place; presetting to trigger an operation of calling a SMI program according to input state change information of GPIO of a PCH chip, where an input state value of the GPIO is determined according to a connection state of the short signal pin and a U.2 slot; calling the SMI program when a change in an input state of the GPIO is detected, and reading the input state (Continued)

value of the GPIO; and breaking a link between a PCIe root bridge and the NVMe solid-state disk by using the SMI program if the input state value of the GPIO is a corresponding value about the NVMe solid-state disk not in place.

17 Claims, 5 Drawing Sheets

(51) Int. Cl.
*G06F 13/24* (2006.01)
*G06F 13/40* (2006.01)

(56) References Cited

FOREIGN PATENT DOCUMENTS

| CN | 109933475 A | 6/2019 |
|---|---|---|
| CN | 112749036 A | 5/2021 |

OTHER PUBLICATIONS

Corresponding International Patent Application No. PCT/CN2021/121413, Written Opinion, Date Mailed Dec. 30, 2021.

* cited by examiner

PROCESSING METHOD, APPARATUS, AND SYSTEM FOR BRUTE FORCE HOT UNPLUG OPERATION ON SOLID STATE DISK, AND MEDIUM

This application claims priority to Chinese Patent Application No. 202110018520.5, filed on Jan. 7, 2021 in China National Intellectual Property Administration and entitled "Processing Method, Apparatus, and System for Brute Force Hot Unplug Operation on Solid-State Disk, and Medium", which is hereby incorporated by reference in its entirety.

FIELD

The present application relates to the field of solid-state disk technology, in particular to a processing method, apparatus, and system for a brute force hot unplug operation on a U.2 Non Waffle Memory express (NVMe) solid-state disk, and a computer-readable storage medium.

BACKGROUND

NVMe (an interface for communication between a host and a non-volatile storage system) is a communication interface protocol based on a non-volatile memory. NVMe fully utilizes characteristics of low latency, parallelism, and high data transfer rate of PCIe (Peripheral Component Interconnect Express, high-speed serial computer extended bus standards) channels to greatly improve read and write performance of NVMe solid-state disks, and also has functions of automatic power consumption state switching and dynamic energy consumption management, making solid-state disks more power-saving. Compared with conventional hard disks such as mechanical hard disks, NVMe solid-state disks have significant advantages and have attracted attention from major manufacturers.

Main physical interfaces of NVMe solid-state disks include PCIe, M.2, and U.2. M.2 is a new generation interface standard that is compatible with multiple communication protocols. U.2 NVMe solid-state disks have characteristics of large capacity and strong scalability, and adopt a standard 2.5-inch structural shell, with more complete power failure protection function and better heat dissipation characteristics, whereby the stability of U.2 NVMe solid-state disks in server system environments is improved, and U.2 NVMe solid-state disks become the most promising and favored solid-state disks in the server market. Compared with conventional hard disks, U.2 NVMe solid-state disks support a brute force hot plug function. A brute force hot plug operation is a hot plug operation without notifying drive processing in advance, which conforms to usage habits of users.

At present, mainstream markets of server systems and U.2 NVMe solid-state disks support the PCIe 3.0 norm at most. When users do not notify a driver in advance to stop IO communication and carries out brute force hot unplug on a U.2 NVMe drive from a server system, unfinished IO requests cannot be processed due to the limitations of the PCIe 3.0 norm, directly causing a waiting timeout error in a processor. Then, the server system is highly likely to crash, which is intolerable for the server market which requires extremely high system stability.

SUMMARY

The present application provides a processing method, apparatus, and system for a brute force hot unplug operation on a U.2 NVMe solid-state disk, and a computer-readable storage medium, which effectively solve, based on the PCIe 3.0 norm, a problem of processor waiting timeout error caused by unfinished IO requests after brute force hot unplug of a U.2 NVMe solid-state disk. In face of the brute force hot unplug of the U.2 NVMe solid-state disk, waiting timeout error information will not be output even if there are unfinished IO requests, server system crashes can be avoided, and server stability can be improved.

To solve the foregoing technical problem, embodiments of the present application provide the following technical solutions:

In a first aspect, an embodiment of the present application provides a processing method for a brute force hot unplug operation on a U.2 NVMe solid-state disk, including:

predefining a short signal pin for detecting whether an NVMe solid-state disk is in place, and presetting to trigger an operation of calling a System Management Interrupt (SMI) program according to input state change information of a General-Purpose input/output (GPIO) of a Platform controller hub (PCH) chip, where the GPIO is connected to the short signal pin, and an input state value of the GPIO is determined according to a connection state of the short signal pin and a U.2 slot;

calling the SMI program in response to a change in an input state of the GPIO being detected, and reading the input state value of the GPIO; and breaking a link between a PCIe root bridge and the NVMe solid-state disk by using the SMI program in response to the input state value of the GPIO being a corresponding value about the NVMe solid-state disk not in place.

In an embodiment, the step of breaking a link between a PCIe root bridge and the NVMe solid-state disk by using the SMI program includes:

setting a link inhibit bit in a link controller by using the SMI program, where the link inhibit bit is used to break the link between the PCIe root bridge and the NVMe solid-state disk, so as to discard IO transaction data or return unsupported request responses in a communication direction from the PCIe root bridge to the NVMe solid-state disk, and to discard unfinished IO transaction data in a communication direction from the NVMe solid-state disk to the PCIe root bridge.

In an embodiment, after breaking a link between a PCIe root bridge and the NVMe solid-state disk by using the SMI program, the method further includes:

checking an in-place state in a slot state register by using the SMI program; and clearing the link inhibit bit of the link controller to recover an original state in response to the NVMe solid-state disk being not in place, and exiting the SMI program.

In an embodiment, the NVMe solid-state disk has a long signal pin, and after reading the input state value of the GPIO, the method further includes:

in response to the input state value of the GPIO being a corresponding value about the NVMe solid-state disk in place, skipping processing a plugged device by the SMI program, returning from the SMI program to recover a saved current state, and continuing to execute an INTx interrupt program, where the INTx interrupt program is generated in response to an in-place state of an in-place signal corresponding to the long signal pin changing.

In an embodiment, the short signal pin is a short pin among power input pins.

In a second aspect, an embodiment of the present application provides a processing apparatus for a brute force hot unplug operation on a U.2 NVMe solid-state disk, including:
- a preprocessing module, configured to predefine a short signal pin for detecting whether an NVMe solid-state disk is in place, and preset to trigger an operation of calling a SMI program according to input state change information of the GPIO of a PCH chip, where the GPIO is connected to the short signal pin, and an input state value of the GPIO is determined according to a connection state of the short signal pin and a U.2 slot;
- an interrupt module, configured to call the SMI program in response to a change in an input state of the GPIO being detected;
- an in-place state value reading module, configured to read the input state value of the GPIO; and
- a link breaking module, configured to break a link between a PCIe root bridge and the NVMe solid-state disk by using the SMI program in response to the input state value of the GPIO being a corresponding value about the NVMe solid-state disk not in place.

An embodiment of the present application further provides a processing apparatus for a brute force hot unplug operation on a U.2 NVMe solid-state disk, including a processor, where the processor is configured to implement the steps of the processing method for a brute force hot unplug operation on a U.2 NVMe solid-state disk as described in any of the foregoing items when executing a computer program stored in a memory.

An embodiment of the present application further provides a computer-readable storage medium storing a processing program for a brute force hot unplug operation on a U.2 NVMe solid-state disk, where the steps of the processing method for a brute force hot unplug operation on a U.2 NVMe solid-state disk as described in any of the foregoing items is implemented when the processing program for a brute force hot unplug operation on a U.2 NVMe solid-state disk is executed by a processor.

An embodiment of the present application finally provides a processing system for a brute force hot unplug operation on a U.2 NVMe solid-state disk, including a processor, an IO extended chip, a PCH chip, a U.2 slot, and an NVMe solid-state disk;
- the NVMe solid-state disk includes a long signal pin and a predefined short signal pin, and the long signal pin and the short signal pin are used to first generate a signal about whether the NVMe solid-state disk is in place in a brute force hot plug scenario and a brute force hot unplug scenario, respectively;
- the long signal pin is connected to the IO extended chip through the U.2 slot to convert an in-place signal corresponding to the long signal pin through the IO extended chip and input the converted in-place signal into the PCIe root bridge of the processor, for notifying the PCIe root bridge whether a device in the U.2 slot is in place; the short signal pin is connected to GPIO of the PCH chip through the U.2 slot;
- input state change information of the GPIO of the PCH chip triggers an operation of calling a SMI program, and an input state value of the GPIO is determined according to a connection state of the short signal pin and the U.2 slot; and
- the processor is configured to implement the steps of the processing method for a brute force hot unplug operation on a U.2 NVMe solid-state disk as described in any of the foregoing items when executing a computer program stored in a memory.

In an embodiment, the long signal pin is connected to input ends of a first resistor and a level conversion circuit respectively; other end of the first resistor is grounded;

an output end of the level conversion circuit is connected to a second resistor and the GPIO respectively; and other end of the second resistor is grounded.

The technical solutions provided in the present application have the following advantages: A short signal pin for detecting whether an NVMe solid-state disk is in place is predefined; in a process of unplugging the NVMe solid-state disk with brute force, the short signal pin leaves a plugged system earlier than a long signal pin, an in-place signal detected through the short signal pin is earlier than complete unplug of the entire NVMe solid-state disk, and in this period, a SMI program is called to break a link between a PCIe root bridge and the NVMe solid-state disk; in this way, unfinished IO requests do not need to be processed, and a processor naturally does not report a waiting timeout error due to unfinished IO requests; therefore, based on the PCIe 3.0 norm, a problem of processor waiting timeout error caused by unfinished IO requests after brute force hot unplug of the U.2 NVMe solid-state disk is solved. In face of the brute force hot unplug of the U.2 NVMe solid-state disk, waiting timeout error information will not be output even if there are unfinished IO requests, server system crashes can be avoided, and server stability can be improved.

In addition, the embodiments of the present application further provide a corresponding implementation apparatus, system, and computer-readable storage medium for the processing method for a brute force hot unplug operation on a U.2 NVMe solid-state disk, further making the method more practical. The apparatus, the system, and the computer-readable storage medium have corresponding advantages.

It should be understood that the above general description and the following detailed description are only exemplary and cannot limit the disclosure.

BRIEF DESCRIPTION OF THE DRAWINGS

In order to describe the embodiments of the present application or the technical solutions in related technologies more clearly, drawings required to be used in the illustration of the embodiments or the related technologies will be briefly introduced below. Apparently, the drawings in the illustration below are only some embodiments of the present application. Those ordinarily skilled in the art also can obtain other drawings according to the provided drawings without creative work.

DETAILED DESCRIPTION

In order to make those skilled in the art better understand the solutions of the present application, the present application will be further described in detail below with reference to the accompanying drawings and certain embodiments. Obviously, the described embodiments are only a part of the embodiments of the present application, rather than all the embodiments. Based on the embodiments of the present application, all other embodiments obtained by those skilled in the art without creative work shall fall within the protection scope of the present application.

The terms "first", "second", "third", "fourth", and the like in the description, claims, and accompanying drawings of the present application are used to distinguish different objects, rather than to describe a certain order. In addition, the terms "include", "have", and any variations thereof are intended to cover a non-exclusive inclusion. For example, a process, method, system, product, or device that includes a series of steps or units is not limited to listed steps or units, but may include unlisted steps or units.

After the technical solutions of the embodiments of the present application are introduced, various non-restrictive implementations of the present application will be described in detail below.

Figure 1:
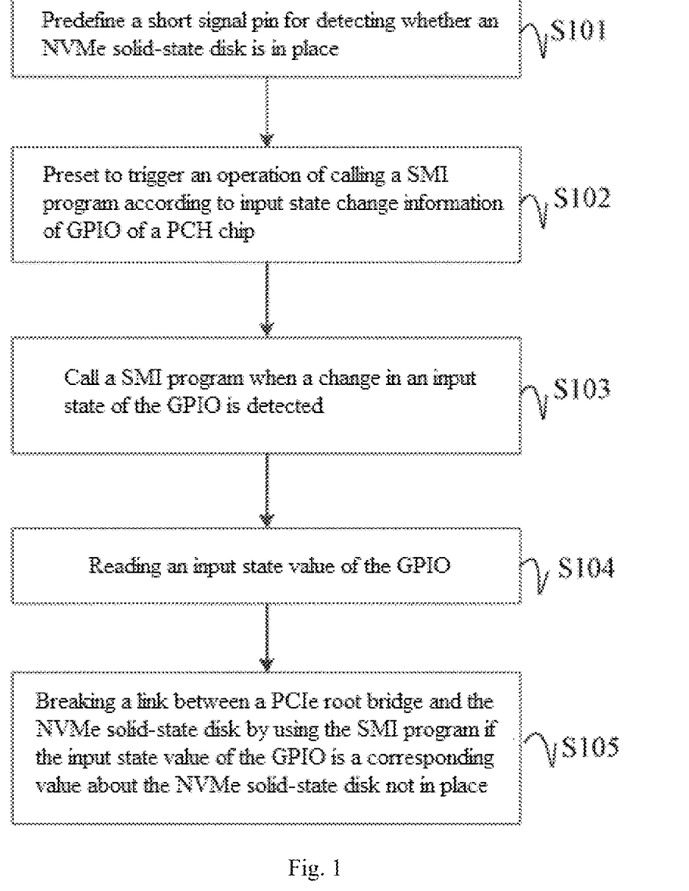
FIG. 1 is a schematic flow chart of a processing method for a brute force hot unplug operation on a U.2 NVMe solid-state disk according to an embodiment of the present application.

First, referring to FIG. 1, which is a schematic flow chart of a processing method for a brute force hot unplug operation on a U.2 NVMe solid-state disk according to an embodiment of the present application. The embodiment of the present application may include the following content:

S101: redefining a short signal pin for detecting whether an NVMe solid-state disk is in place.

Figure 2:
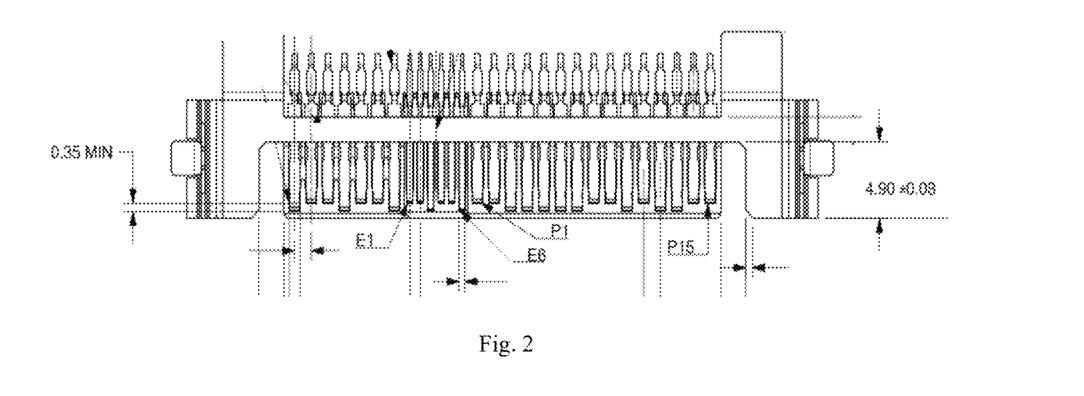
FIG. 2 is a schematic diagram of interface pin parameters against brute force on a U.2 NVMe solid-state disk according to an embodiment of the present application.

Interface pins of a U.2 NVMe solid-state disk may be shown in FIG. 2. Each pin of the U.2 NVMe solid-state disk has a length L of about 5 millimeters, and the minimum difference in length l between a long pin and a short pin is 0.35 millimeters. The U.2 NVMe solid-state disk stabilizes in a U.2 slot and remains stationary. When external force greaterhan friction force is applied, the U.2 NVMe solid-state disk begins to be unplugged quickly, where the combined force of the external force and the friction force is small. An estimated unplug acceleration a of the solid-state disk is about 10 meters per square second. An acceleration displacement formula at an initial speed of 0 is: distance $$L = \frac{1}{2}at^2,$$

where a is an acceleration, and t is time when the solid-state disk is completely unplugged. When L is 5 millimeters, the acceleration a is 10 meters per square second, and t is about 30 milliseconds. When the solid-state disk is completely unplugged, the speed v=at, namely, 0.3 meters per second, the time required from disconnection of the short pin to disconnection of the long pin is about $$T = \frac{l}{v},$$

where l is 0.35 millimeters, v is 0.3 meters per second, and T is about millisecond. It may be estimated that the time required from disconnection of the short pin from the slot to disconnection of the long pin from the slot is on an order of milliseconds. The time required for a processor to execute instructions is on an order of nanoseconds, and the time required for the processor to process communication between a Me root bridge and a U.2 NVMe solid-state disk is on an order of microseconds. Therefore, the time required for the processor to process a brute force hot unplug behavior on the U.2 NVMe solid-state disk is less than the millisecond time T. Therefore, the short signal pin may be used to detect whether the solid-state disk is unplugged with brute force from the U.2 slot. In the period of time when the short signal pin leaves the U.2 slot and the long signal pin leaves the U.2 slot, that is, when the solid-state disk is completely unplugged, the system processor has enough time to process the communication between the PCIe root bridge and the U.2 NVMe solid-state disk.

S102: presetting to trigger an operation of calling a SMI program according to input state change information of GPIO of a PCH chip.

The GPIO of the PCH (integrated south bridge) chip is connected to the short signal pin predefined in S101, and an input state value of the GPIO is determined according to a connection state of the short signal pin and the U.2 slot. The connection state of the short signal pin and the U.2 slot is either connection or disconnection. Correspondingly, the GPIO has two input state values, corresponding to the two states. That is, the two input state values of the GPIO correspond to whether the NVMe solid-state disk is in place or not. The input state values of the GPIO may be predefined according to whether the NVMe solid-state disk is in place or not. For example, the input state value of the GPIO at a high level corresponds to the NVMe solid-state disk in place, and the input state value of the GPIO at a low level corresponds to the NVMe solid-state disk not in place. In this case, whether the NVMe solid-state disk is in place may be determined according to the read input state value of the GPIO. The input state change information of the GPIO indicates that the input state value of the GPIO changes from one value to another. As long as the input state value of the GPIO changes from one value to another, the operation of triggering the SMI program is triggered. A CPU provides SMI, and the CPU enters a system management mode (SMM) in use. The CPU stores a value of a register in a SMRAM before entering the SMM, and then a program jumps to a SMI ENTRY POINT for execution. After processing, the program jumps back to the original place by using a RSM instruction to continue the execution, and the value of the CPU register is restored at the same time. SMI may include software interrupt and hardware interrupt, that is, interrupt caused by program settings and interrupt caused by external hardware, such as interrupt caused by pressing a power button. The SMI program in the present application is software interrupt.

S103: calling a SMI program when a change in an input state of the GPIO is detected.

S104: reading an input state value of the GPIO.

S105: breaking a link between a PCIe root bridge and the NVMe solid-state disk by using the SMI program if the input state value of the GPIO is a corresponding value about the NVMe solid-state disk not in place.

Figure 3:
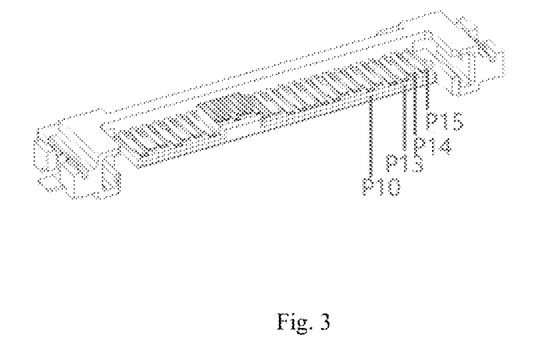
FIG. 3 is a schematic diagram of power pins against brute force on a U.2 NVMe solid-state disk according to an embodiment of the present application.

It may be understood that brute force hot plug and unplug on the U.2 NVMe solid-state disk includes brute force hot plug and brute force hot unplug. As shown in FIG. 3, an in-place signal of interface pin P10 of the U.2 NVMe solid-state disk is PRSNT #, belonging to a long pin signal. When brute force hot plug occurs, the in-place signal PRSNT # is first in contact with a pin of the U.2 slot, causing a signal level change that is notified to the server system for processing, whereby the U.2 NVMe solid-state disk can be used normally. When brute force hot unplug occurs, the in-place signal PRSNT # is delayed and disconnected from the pin of the U.2 slot, causing a signal level change that cannot be notified in advance to the server system for processing. Therefore, a short pin signal is needed to notify the server system in advance for processing when the brute force hot unplug occurs. When it is determined according to the read input state value of the GPIO that the NVMe solid-state disk is not in place, the SMI program is triggered and called, and the SMI program breaks the link between the PCIe root bridge and the NVMe solid-state disk. In this way, even if there are unfinished IO requests, the processor will not delay to report errors for these unfinished IO due to communication disconnection.

In the technical solution provided in the embodiment of the present application, a short signal pin for detecting whether an NVMe solid-state disk is in place is predefined; in a process of unplugging the NVMe solid-state disk with brute force, the short signal pin leaves a plugged system earlier than a long signal pin, an in-place signal detected through the short signal pin is earlier than complete unplug of the entire NVMe solid-state disk, and in this period, a SMI program is called to break a link between a PCIe root bridge and the NVMe solid-state disk; in this way, unfinished IO requests do not need to be processed, and a processor naturally does not report a waiting timeout error due to unfinished IO requests; therefore, based on the PCIe 3.0 norm, a problem of processor waiting timeout error caused by unfinished IO requests after brute force hot unplug of the U.2 NVMe solid-state disk is solved. In face of the brute force hot unplug of the U.2 NVMe solid-state disk, waiting timeout error information will not be output even if there are unfinished IO requests, server system crashes can be avoided, and server stability can be improved.

The foregoing embodiment does not define which interface pin of the solid-state disk the short signal pin is. As an alternative implementation, the short signal pin may be a short pin among power input pins.

As shown in FIGS. 3, P13, P14, and P15 are pins connected to a 12 volt power supply to provide power for the U.2 NVMe solid-state disk, and the three pins are connected in the solid-state disk. As long as one of the pins is connected to the 12 volt power supply, the other two pins also generate a 12 volt high voltage level. Each of the three pins can withstand a continuous current of 1.5 amperes and a peak current of 2.5 amperes. The rated current of the U.2 NVMe solid-state disk is about 2 amperes. Therefore, two power pins are connected to the power supply to fully meet a current requirement of the solid-state disk. Among the three pins, P13 is a long pin, and P14 and P15 are short pins. The P15 pin may not be used as a power input pin, but instead as a signal to detect whether the solid-state disk is in place and notify the server system to process the brute force hot unplug behavior on the U.2 NVMe solid-state disk.

Figure 4:
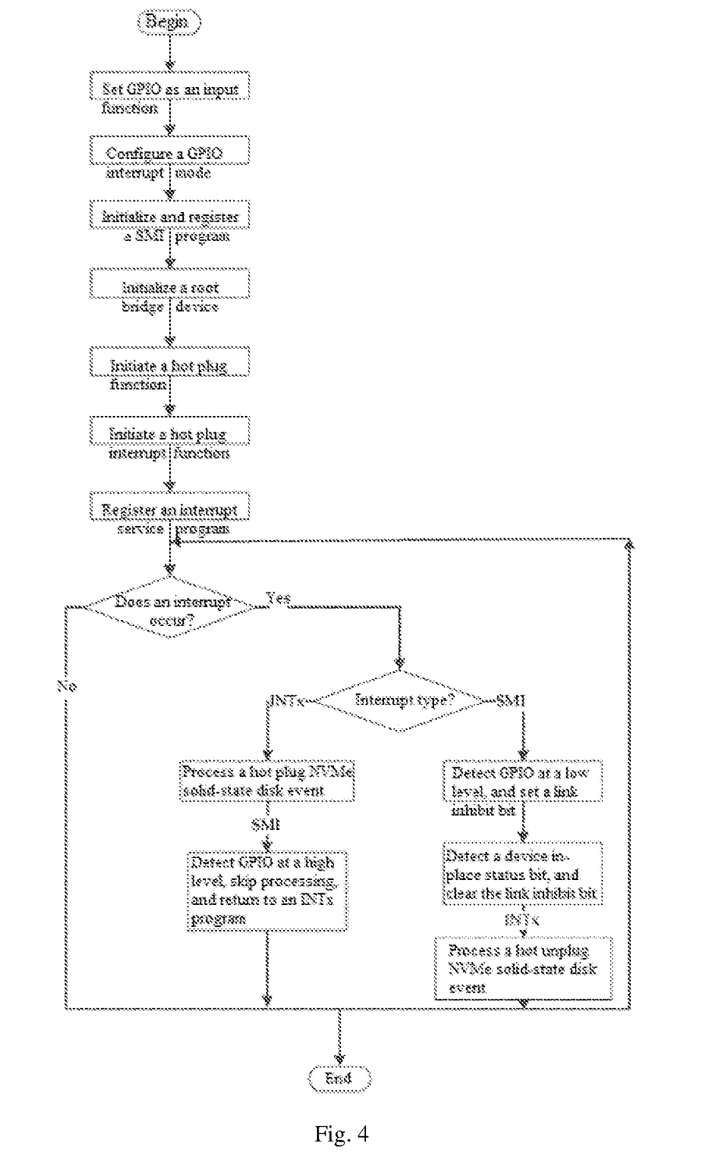
FIG. 4 is a schematic flow chart of another processing method for a brute force hot unplug operation on a U.2 NVMe solid-state disk according to an embodiment of the present application.

It may be understood that plugged or unplugged signal information is generated after brute force hot plug or unplug of the U.2 NVMe solid-state disk, and the system processes the generated device plug signal or device unplug signal and inputs the signal into the PCH chip and the processor. Whether the solid-state disk is plugged or unplugged is determined by detecting the input signal, and a different processing measure is taken. The foregoing embodiment does not provide processing manners for a device in place and a device not in place. There are no restrictions on how to process in case of a device in place and a device not in place. This embodiment provides an implementation, as shown in FIG. 4, including the following steps:

If the NVMe solid-state disk is not in place, a link inhibit bit is set in a link controller by using the SMI program. The link inhibit bit is used to break the link between the PCIe root bridge and the NVMe solid-state disk, so as to discard IO transaction data or return unsupported request responses in a communication direction from the PCIe root bridge to the NVMe solid-state disk, and to discard unfinished IO transaction data in a communication direction from the NVMe solid-state disk to the PCIe root bridge. The SMI program checks an in-place state in a slot state register. If the NVMe solid-state disk is not in place, the SMI program clears the link inhibit bit of the link controller to recover an original state, and exits.

If the input state value of the GPIO is a corresponding value about the NVMe solid-state disk in place, that is, if the NVMe solid-state disk is in place, the SMI program does not process a plugged device and returns to recover a saved current state, and an INTx interrupt program continues to be executed, where the INTx interrupt program is generated when an in-place state of an in-place signal corresponding to the long signal pin changes.

It should be noted that there is no strict order of execution between the steps in the present application. As long as a logical order is followed, these steps may be executed simultaneously or in a preset order. FIG. 1 and FIG. 4 are only schematic and do not necessarily represent the only order of execution.

An embodiment of the present application further provides a corresponding apparatus for the processing method for a brute force hot unplug operation on a U.2 NVMe solid-state disk, further making the method more practical. The apparatus may be explained separately from the perspective of functional modules and hardware. The processing apparatus for a brute force hot unplug operation on a U.2 NVMe solid-state disk according to the embodiment of the present application is introduced below. Mutual reference may be made to the processing apparatus for a brute force hot unplug operation on a U.2 NVMe solid-state disk described below and the processing method for a brute force hot unplug operation on a U.2 NVMe solid-state disk described above.

Figure 5:
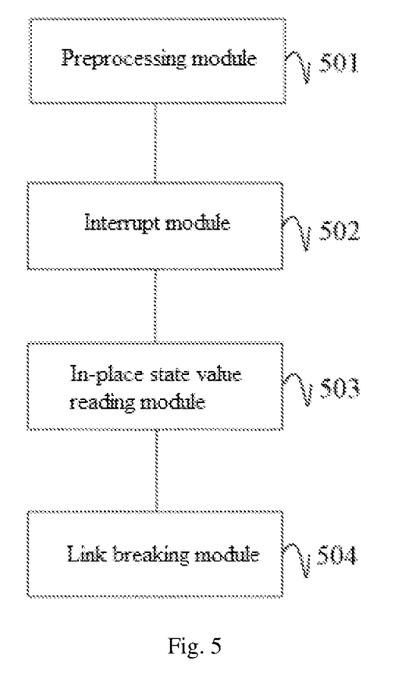
FIG. 5 is a structural diagram of a certain implementation of a processing apparatus for a brute force hot unplug operation on a U.2 NVMe solid-state disk according to an embodiment of the present application.

From the perspective of functional modules, referring to FIG. 5. FIG. 5 is a structural diagram of a processing apparatus for a brute force hot unplug operation on a U.2 NVMe solid-state disk according to an embodiment of the present application in a certain implementation. The apparatus may include:

a preprocessing module 501, configured to predefine a short signal pin for detecting whether an NVMe solid-state disk is in place, and preset to trigger an operation of calling a SMI program according to input state change information of GPIO of a PCH chip, where the GPIO is connected to the short signal pin, and an input state value of the GPIO is determined according to a connection state of the short signal pin and a U.2 slot;

an interrupt module 502, configured to call the SMI program when a change in an input state of the GPIO is detected;

an in-place state value reading module 503, configured to read the input state value of the GPIO; and a link breaking module 504, configured to break a link between a PCIe root bridge and the NVMe solid-state disk by using the SMI program if the input state value of the GPIO is a corresponding value about the NVMe solid-state disk not in place.

In an embodiment, in some implementations of this embodiment, the link breaking module 504 may be further configured to:

set a link inhibit bit in a link controller by using the SMI program, where the link inhibit bit is used to break the link between the PCIe root bridge and the NVMe solid-state disk, so as to discard IO transaction data or return unsupported request responses in a communication direction from the PCIe root bridge to the NVMe solid-state disk, and to discard unfinished IO transaction data in a communication direction from the NVMe solid-state disk to the PCIe root bridge.

As an alternative implementation, the link breaking module 504 may further include, for example, a recovery submodule, which is configured to check an in-place state in a slot state register by using the SMI program, clear the link inhibit bit of the link controller to recover an original state if the NVMe solid-state disk is not in place, and exit the SMI program.

In an embodiment, in other implementations of this embodiment, the apparatus may further include, for example, a plug interrupt processing module, which may be configured to skip processing a plugged device by using the SMI program if the input state value of the GPIO is a corresponding value about the NVMe solid-state disk in place, return from the SMI program, recover a saved current state, and continue to execute an INTx interrupt program, where the INTx interrupt program is generated when an in-place state of an in-place signal corresponding to the long signal pin changes.

The functions of the functional modules of the processing apparatus for a brute force hot unplug operation on a U.2 NVMe solid-state disk according to the embodiment of the present application may be implemented according to the method in the foregoing method embodiment. The implementation process may be referenced to the relevant description of the foregoing method embodiment, and will not be repeated here.

From the above, it may be seen that the embodiment of the present application can effectively solve, based on the PCIe 3.0 norm, a problem of processor waiting timeout error caused by unfinished IO requests after brute force hot unplug of a U.2 NVMe solid-state disk. In face of the brute force hot unplug of the U.2 NVMe solid-state disk, waiting timeout error information will not be output even if there are unfinished IO requests, server system crashes can be avoided, and server stability can be improved.

Figure 6:
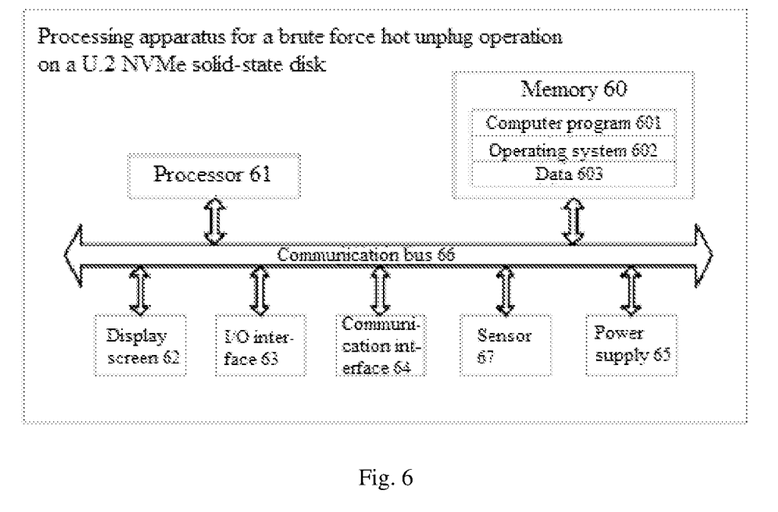
FIG. 6 is a structural diagram of another certain implementation of a processing apparatus for a brute force hot unplug operation on a U.2 NVMe solid-state disk according to an embodiment of the present application.

The processing apparatus for a brute force hot unplug operation on a U.2 NVMe solid-state disk mentioned above is described from the perspective of functional modules. Further, the present application provides a processing apparatus for a brute force hot unplug operation on a U.2 NVMe solid-state disk, which is described from the perspective of hardware. FIG. 6 is a structural diagram of another processing apparatus for a brute force hot unplug operation on a U.2 NVMe solid-state disk according to an embodiment of the present application. As shown in FIG. 6, the apparatus includes: a memory 60, configured to store a computer program; and a processor 61, configured to implement the steps of the processing method for a brute force hot unplug operation on a U.2 NVMe solid-state disk as mentioned in any of the foregoing embodiments when executing the computer program.

The processor 61 may include one or more processing cores, such as a 4-core processor or an 8-core processor. The processor 61 may be implemented in at least one hardware form of Digital Signal Processing (DSP), Field-Programmable Gate Array (FPGA), and Programmable Logic Array (PLA). The processor 61 may alternatively include a main processor and a co-processor. The main processor is a processor for processing data in a wake-up state, also known as a Central Processing Unit (CPU). The co-processor is a low-power processor for processing data in a standby mode. In some embodiments, the processor 61 may be integrated with a Graphics Processing Unit (GPU), which is responsible for rendering and drawing content required for display on a display screen. In some embodiments, the processor 61 may further include an Artificial Intelligence (AI) processor for processing computational operations related to machine learning.

The memory 60 may include one or more computer-readable storage media, which may be non-transient. The memory 60 may further include a high-speed random access memory and a non-volatile memory, such as one or more disk storage devices and flash memory storage devices. In this embodiment, the memory 60 is at least configured to store the following computer program 601, where after the computer program is loaded and executed by the processor 61, the relevant steps of the processing method for a brute force hot unplug operation on a U.2 NVMe solid-state disk as disclosed in any of the foregoing embodiments may be implemented. In addition, resources stored in the memory 60 can further include an operating system 602, data 603, and the like. A storage manner may be temporary storage or permanent storage. The operating system 602 may include Windows, Unix, Linux, or the like. The data 603 may include, but are not limited to, data corresponding to results of processing a brute force hot unplug operation on a U.2 NVMe solid-state disk.

In some embodiments, the processing apparatus for a brute force hot unplug operation on a U.2 NVMe solid-state disk may further include a display screen 62, an input/output interface 63, a communication interface 64, a power supply 65, and a communication bus 66.

Those skilled in the art may understand that the structure shown in FIG. 6 does not constitute a limitation on the processing apparatus for a brute force hot unplug operation on a U.2 NVMe solid-state disk, and may include more or fewer components than shown, such as a sensor 67.

The functions of the functional modules of the processing apparatus for a brute force hot unplug operation on a U.2 NVMe solid-state disk according to the embodiment of the present application may be implemented according to the method in the foregoing method embodiment. The implementation process may be referenced to the relevant description of the foregoing method embodiment, and will not be repeated here.

From the above, it may be seen that the embodiment of the present application can effectively solve, based on the PCIe 3.0 norm, a problem of processor waiting timeout error caused by unfinished IO requests after brute force hot unplug of a U.2 NVMe solid-state disk. In face of the brute force hot unplug of the U.2 NVMe solid-state disk, waiting timeout error information will not be output even if there are unfinished IO requests, server system crashes can be avoided, and server stability can be improved.

It may be understood that if the processing method for a brute force hot unplug operation on a U.2 NVMe solid-state disk in the foregoing embodiment may be stored in a computer-readable storage medium when being implemented in a form of software functional units and sold or used as an independent product. Based on such an understanding, the technical solutions of the present application essentially, or the part contributing to the prior art, or all or some of the technical solutions may be implemented in a form of a software product. The computer software product is stored in a storage medium to perform all or some of the steps of the methods described in the embodiments of the present application. The foregoing storage medium includes various media that may store program code, such as a USB flash drive, a mobile hard disk, a read-only memory (ROM), a random access memory (RAM), an electrically erasable programmable ROM, a register, a hard disk, a removable disk, a CD-ROM, a magnetic disk, or an optical disc.

Based on this, an embodiment of the present application further provides a computer-readable storage medium storing a processing program for a brute force hot unplug operation on a U.2 NVMe solid-state disk. When the processing program for a brute force hot unplug operation on a U.2 NVMe solid-state disk is executed by a processor, the steps of the processing method for a brute force hot unplug operation on a U.2 NVMe solid-state disk as described in any of the foregoing embodiments are implemented.

The functions of the functional modules of the computer-readable storage medium described in the embodiment of the present application may be implemented according to the method in the foregoing method embodiment. The implementation process may be referenced to the relevant description of the foregoing method embodiment, and will not be repeated here.

From the above, it may be seen that the embodiment of the present application can effectively solve, based on the PCIe 3.0 norm, a problem of processor waiting timeout error caused by unfinished IO requests after brute force hot unplug of a U.2 NVMe solid-state disk. Therefore, in face of brute force hot unplug of the U.2 NVMe solid-state disk, waiting timeout error information will not be output even if there are unfinished IO requests, server system crashes can be avoided, and server stability can be improved.

An embodiment of the present application further provides a processing system for a brute force hot unplug operation on a U.2 NVMe solid-state disk, which may include a processor, an IO extended chip, a PCH chip, a U.2 slot, and an NVMe solid-state disk.

The NVMe solid-state disk includes a long signal pin and a predefined short signal pin. Both the long signal pin and the short signal pin may detect whether the NVMe solid-state disk is plugged or unplugged. The long signal pin is longer than the short signal pin. The long signal pin and the short signal pin first generate a signal about whether the NVMe solid-state disk is in place in a brute force hot plug scenario and a brute force hot unplug scenario, respectively. The long signal pin is used to first generate an in-place signal when the solid-state disk is plugged into the U.2 slot, and the short signal pin is used to first generate a not-in-place signal when the NVMe solid-state disk is unplugged out of the U.2 slot. That is, for the brute force hot plug scenario, the long signal pin is first in contact with the U.2 slot, so the long signal pin first generates an NVMe solid-state disk in-place signal. After the entire NVMe solid-state disk is completely plugged, the short signal pin also generates an NVMe solid-state disk in-place signal. For the brute force hot unplug scenario, the short signal pin first leaves the U.2 slot, so the short signal pin first generates an NVMe solid-state disk not-in-place signal. After the entire NVMe solid-state disk is completely unplugged, the long signal pin also generates an NVMe solid-state disk not-in-place signal. When the first in-place signal or not-in-place signal is received, a corresponding operation is performed according to the difference of time when the long and short signal pins generate signals to solve technical problems. The long signal pin is an inherent interface pin of the NVMe solid-state disk, and a short signal pin in the NVMe solid-state disk is predefined to detect whether the NVMe solid-state disk is in place to replace the original pin function.

The long signal pin is connected to the IO extended chip through the U.2 slot to convert the in-place signal corresponding to the long signal pin, and then the converted in-place signal is input into a PCIe root bridge of the processor to notify the PCIe root bridge whether a device in the U.2 slot is in place; and the short signal pin is connected to GPIO of the PCH chip through the U.2 slot. Input state change information of the GPIO of the PCH chip triggers an operation of calling a SMI program, and an input state value of the GPIO is determined according to a connection state of the short signal pin and the U.2 slot; The processor is configured to implement the steps of the processing method for a brute force hot unplug operation on a U.2 NVMe solid-state disk in any of the foregoing embodiments when executing a computer program stored in a memory.

As an alternative implementation, in order to recognize high and low level signals, the long signal pin is connected to input ends of a first resistor and a level conversion circuit respectively; the other end of the first resistor is grounded; an output end of the level conversion circuit is connected to a second resistor and the GPIO respectively; and the other end of the second resistor is grounded.

Figure 7:
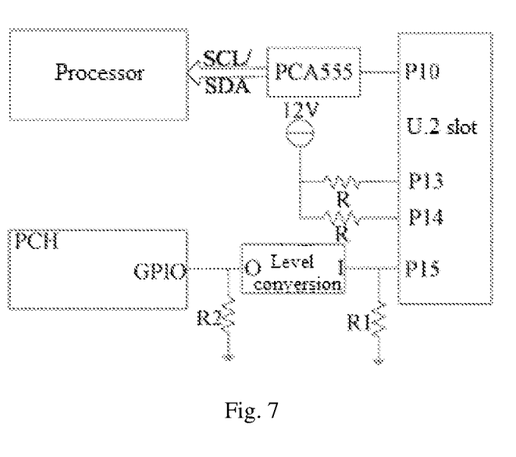
FIG. 7 is a structural diagram of a certain implementation of a processing system for a brute force hot unplug operation on a U.2 NVMe solid-state disk according to an embodiment of the present application.

In order to make those skilled in the art more clear about the technical solution of the present application, P10 is a long signal pin, and P15 short pin among power pins is used as a short signal pin of the technical solution of the present application. The entire technical solution is explained in combination with the system shown in FIG. 7 as a schematic example, which may include the following content:

As shown in FIG. 7, a P10 in-place signal, namely, PRSNT #, on the U.2 slot is connected to the IO extended chip PCA555, and then a SMBus signal of PCA555 is connected to the processor. The P10 in-place signal is input into the chip PCA555, a parallel signal is converted into a SMBus serial signal, and then the serial signal is input into the PCIe root bridge of the processor to notify the PCIe root bridge whether the device in the U.2 slot is in place. The P13 long pin is connected to a 12 volt power supply through a resistor R, and the P14 short pin is connected to the 12 volt power supply through a resistor R. When the U.2 NVMe solid-state disk is plugged, P13 and P14 jointly provide power. The P15 short pin is grounded through a resistor R1 and is also connected to the input end I of the 12-volt to 3.3-volt level conversion circuit. After a 12-volt level is converted into a 3.3-volt level through the circuit, the 3.3-volt level is output through the output end O, grounded through a resistor R2, and connected to a GPIO pin of the PCH. When no device is in place, the input port I inputs low level, the output port O outputs low level, and the GPIO inputs low level. When a device is in place, the input port I inputs high level, the output port O outputs high level, and the GPIO inputs high level.

Based on the foregoing hardware connection relationship, combined with FIG. 4, a BIOS program that implements the processing method for a brute force hot unplug operation on a U.2 NVMe solid-state disk may include:

A server system is powered on and runs, BIOS initializes GPIO, a GPIO function selection register is configured, GPIO is set as an input function, GPIO is initiated and its input state changes to generate a SMI function, edge trigging is set as a mechanism of triggering interrupt, and a SMI program is registered into a service program list. When the GPIO state change triggers SMI, the SMI program is called. BIOS initializes a PCIe root bridge device. Interrupt, resources, and the like are configured, a slot capability register is configured, a slot hot plug and unplug capability is initiated, a brute force hot plug and unplug function is configured, a slot power control function is initiated, an INTx interrupt trigger function is configured, and an interrupt service program is registered into a service list. A brute force hot plug or unplug operation on the U.2 NVMe solid-state disk is waited. If there is no operation, no interrupt occurs, and waiting continues, or the program may be alternatively terminated, for example, the system is shut down. If there is an operation, an interrupt occurs. If the operation is a brute force hot plug action, the long interface pin P13 of the solid-state disk is first in contact with a power pin of the U.2 slot to provide power for the solid-state disk. The long signal pin P10 is first in contact with a signal pin of the U.2 slot, an in-place signal changes the in-place state to cause an INTx interrupt, and the interrupt service program is called to process hot functional configuration of the device. Subsequently, the short pin P15 is also in contact with a pin of the U.2 slot and inputs a high level to GPIO. The level changes from low to high to trigger a SMI at the edge, the SMI has the highest priority, the current state is immediately saved, and the SMI program is called. In the SMI program, the GPIO state is read as high level, indicating that the device is in place. Because the SMI is caused by plugging the device, the SMI program does not process the device plug operation, the SMI program is immediately returned, the saved current state is recovered, the INTx interrupt program continues to be executed, the functional configuration is completed, and the U.2 NVMe solid-state disk is initiated to work normally. If the operation is a brute force hot unplug action, the short interface pin P15 of the solid-state disk is first disconnected from the pin of the U.2 slot, the long pin P13 is still in contact with the power pin of the U.2 slot to provide power for the solid-state disk and input a low level to GPIO, the level changes from high to low to trigger a SMI at the edge, and the SMI service program is called. In the SMI program, the GPIO state is read as low level, indicating that the device is not in place. Because the SMI is caused by unplugging the device, the program sets a link inhibit bit in a link controller to break the link between the PCIe root bridge and the solid-state disk. After the link inhibit bit is set, the PCIe root bridge and the solid-state disk communicate with each other; in the communication direction from the PCIe root bridge to the solid-state disk, IO transaction data are discarded or unsupported request responses are returned; in the communication direction from the solid-state disk to the PCIe root bridge, finished IO transactions are used normally, and unfinished IO transactions will be discarded; and the PCIe root bridge and the solid-state disk interact for an ordered set of 16 to 32 training sequences, and the link between the PCIe root bridge and the solid-state disk enters an inhibit state. The SMI program checks the in-place state in the slot state register. If the device is not in place, the SMI program clears the link inhibit bit in the link controller, recovers the original state, waits for a next hot plug link, and exits. For the INTx interrupt generated by the disconnection of the long interface signal pin P10 of the solid-state disk from the pin of the U.2 slot, the waiting interrupt program begins to process the hot unplug operation on the NVMe solid-state disk. After the link inhibit bit is set in the SMI program, IO transactions are processed without causing processor waiting timeout and system crashes.

Processes of information interaction, execution, and the like between the functional modules and units in the foregoing system are based on the same concept as the foregoing method embodiment, so the content may be referenced to the description in the method embodiment, and will not be repeated here.

From the above, it may be seen that the embodiment of the present application can effectively solve, based on the PCIe 3.0 norm, a problem of processor waiting timeout error caused by unfinished IO requests after brute force hot unplug of a U.2 NVMe solid-state disk. In face of the brute force hot unplug of the U.2 NVMe solid-state disk, waiting timeout error information will not be output even if there are unfinished IO requests, server system crashes can be avoided, and server stability can be improved.

The embodiments in this specification are described in a progressive manner. The description of each of the embodiments focuses on differences from other embodiments, and reference may be made to each other for the same or similar parts among the embodiments. The apparatus disclosed in the embodiment corresponds to the method disclosed in the embodiment and is thus described relatively simply, and reference may be made to the description of the method for the related parts.

Those skilled in the art may be further aware that the units and algorithm steps in the examples described with reference to the embodiments disclosed in this specification may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraints of the technical solutions. Those skilled in the art may use different methods to implement the described functions for each particular application, but it should not be considered that the implementation goes beyond the scope of the present application.

The above details the processing method, apparatus, and system for a brute force hot unplug operation on a U.2 NVMe solid-state disk, and the computer-readable storage medium. Examples are used here to elaborate the principle and implementations of the present application. The descriptions of the above embodiments are merely used for assisting in understanding the method of the present application and the core idea thereof. It should be noted that those of ordinary skilled in the art may further make improvements and modifications to the present application without departing from the principle of the present application, and these improvements and modifications shall fall within the protection scope of the claims of the present application.

What is claimed is:

1. A processing method for a brute force hot unplug operation on a U.2 Non-Volatile Memory Express (NVMe) solid-state disk, comprising:

predefining a short signal pin for detecting whether an NVMe solid-state disk is in place, and presetting to trigger an operation of calling a System Management Interrupt (SMI) program according to input state change information of a General-Purpose input/output (GPIO) of a Platform controller hub (PCH) chip, wherein the GPIO is connected to the short signal pin, and an input state value of the GPIO is determined according to a connection state of the short signal pin and a U.2 slot;

calling the SMI program in response to a change in an input state of the GPIO being detected, and reading the input state value of the GPIO; and breaking a link between a Peripheral Component Interconnect Express (PCIe) root bridge and the NVMe solid-state disk by using the SMI program in response to the input state value of the GPIO being a corresponding value about the NVMe solid-state disk not in place;

wherein the step of breaking a link between a PCIe root bridge and the NVMe solid-state disk by using the SMI program comprises:

setting a link inhibit bit in a link controller by using the SMI program, wherein the link inhibit bit is used to break the link between the PCIe root bridge and the NVMe solid-state disk, so as to discard input/output (IO) transaction data or return unsupported request responses in a communication direction from the PCIe root bridge to the NVMe solid-state disk, and to discard unfinished IO transaction data in a communication direction from the NVMe solid-state disk to the PCIe root bridge.

2. The processing method for a brute force hot unplug operation on a U.2 NVMe solid-state disk according to claim 1, wherein after the step of breaking a link between a PCIe root bridge and the NVMe solid-state disk by using the SMI program, the method further comprises:

checking an in-place state in a slot state register by using the SMI program; and clearing the link inhibit bit of the link controller to recover an original state in response to the NVMe solid-state disk being not in place, and exiting the SMI program.

3. The processing method for a brute force hot unplug operation on a U.2 NVMe solid-state disk according to claim 1, wherein the NVMe solid-state disk has a long signal pin, and after reading the input state value of the GPIO, the method further comprises:

in response to the input state value of the GPIO being a corresponding value about the NVMe solid-state disk in place, skipping processing a plugged device by the SMI program, returning from the SMI program to recover a saved current state, and continuing to execute an INTx interrupt program, wherein the INTx interrupt program is generated in response to an in-place state of an in-place signal corresponding to the long signal pin changing.

4. The processing method for a brute force hot unplug operation on a U.2 NVMe solid-state disk according to claim 1, wherein the short signal pin is a short pin among power input pins.

5. The processing method for a brute force hot unplug operation on a U.2 NVMe solid-state disk according to claim 1, wherein the step of presetting to trigger an operation of calling a SMI program according to input state change information of a GPIO of a PCH chip comprises:

storing, in a Central Processing Unit (CPU), a value of a register in a System Management RAM (SMRAM) before entering a System Management Mode (SMM), and jumping to an SMI ENTRY POINT for execution.

6. The processing method for a brute force hot unplug operation on a U.2 NVMe solid-state disk according to claim 1, wherein the SMI program is in a form of software interrupt.

7. A processing apparatus for a brute force hot unplug operation on a U.2 Non-Volatile Memory Express (NVMe) solid-state disk, comprising a processor and a memory storing a computer program, wherein the processor is configured to execute the computer program, and upon execution of the computer program, is configured to:

predefine a short signal pin for detecting whether an NVMe solid-state disk is in place, and preset to trigger an operation of calling a System Management Interrupt (SMI) program according to input state change information of a General-Purpose input/output (GPIO) of a Platform controller hub (PCH) chip, wherein the GPIO is connected to the short signal pin, and an input state value of the GPIO is determined according to a connection state of the short signal pin and a U.2 slot;

call the SMI program in response to a change in an input state of the GPIO being detected, and read the input state value of the GPIO; and break a link between a Peripheral Component Interconnect Express (PCIe) root bridge and the NVMe solid-state disk by using the SMI program in response to the input state value of the GPIO being a corresponding value about the NVMe solid-state disk not in place;

wherein the step of breaking a link between a PCIe root bridge and the NVMe solid-state disk by using the SMI program comprises:

setting a link inhibit bit in a link controller by using the SMI program, wherein the link inhibit bit is used to break the link between the PCIe root bridge and the NVMe solid-state disk, so as to discard input/output (IO) transaction data or return unsupported request responses in a communication direction from the PCIe root bridge to the NVMe solid-state disk, and to discard unfinished IO transaction data in a communication direction from the NVMe solid-state disk to the PCIe root bridge.

8. The processing apparatus for a brute force hot unplug operation on a U.2 NVMe solid-state disk according to claim 7, wherein the processor, upon execution of the computer program, is further configured to:

check an in-place state in a slot state register by using the SMI program; and clear the link inhibit bit of the link controller to recover an original state in response to the NVMe solid-state disk being not in place, and exit the SMI program.

9. The processing apparatus for a brute force hot unplug operation on a U.2 NVMe solid-state disk according to claim 7, wherein the NVMe solid-state disk has a long signal pin, and after reading the input state value of the GPIO, and the processor, upon execution of the computer program, is further configured to:

in response to the input state value of the GPIO being a corresponding value about the NVMe solid-state disk in place, skip processing a plugged device by the SMI program, return from the SMI program to recover a saved current state, and continue to execute an INTx interrupt program, wherein the INTx interrupt program is generated in response to an in-place state of an in-place signal corresponding to the long signal pin changing.

10. The processing apparatus for a brute force hot unplug operation on a U.2 NVMe solid-state disk according to claim 7, wherein the short signal pin is a short pin among power input pins.

11. The processing apparatus for a brute force hot unplug operation on a U.2 NVMe solid-state disk according to claim 7, wherein the processor, upon execution of the computer program, is further configured to:
  store, in a Central Processing Unit (CPU), a value of a register in a System Management RAM (SMRAM) before entering a System Management Mode (SMM), and jump to an SMI ENTRY POINT for execution.

12. The processing apparatus for a brute force hot unplug operation on a U.2 NVMe solid-state disk according to claim 7, wherein the SMI program is in a form of software interrupt.

13. A non-transitory computer-readable storage medium, storing a processing program for a brute force hot unplug operation on a U.2 Non-Volatile Memory Express (NVMe) solid-state disk, wherein the processing program, when executed by a processor, is configured to cause the processor to:
  predefine a short signal pin for detecting whether an NVMe solid-state disk is in place, and preset to trigger an operation of calling a System Management Interrupt (SMI) program according to input state change information of a General-Purpose input/output (GPIO) of a Platform controller hub (PCH) chip, wherein the GPIO is connected to the short signal pin, and an input state value of the GPIO is determined according to a connection state of the short signal pin and a U.2 slot;
  call the SMI program in response to a change in an input state of the GPIO being detected, and read the input state value of the GPIO; and
  break a link between a Peripheral Component Interconnect Express (PCIe) root bridge and the NVMe solid-state disk by using the SMI program in response to the input state value of the GPIO being a corresponding value about the NVMe solid-state disk not in place;
  wherein the step of breaking a link between a PCIe root bridge and the NVMe solid-state disk by using the SMI program comprises:
    setting a link inhibit bit in a link controller by using the SMI program, wherein
    the link inhibit bit is used to break the link between the PCIe root bridge and the NVMe solid-state disk, so as to discard input/output (IO) transaction data or return unsupported request responses in a communication direction from the PCIe root bridge to the NVMe solid-state disk, and to discard unfinished IO transaction data in a communication direction from the NVMe solid-state disk to the PCIe root bridge.

14. The non-transitory computer-readable storage medium according to claim 13, wherein the processing program, when executed by the processor, is configured to cause the processor to:
  check an in-place state in a slot state register by using the SMI program; and
  clear the link inhibit bit of the link controller to recover an original state in response to the NVMe solid-state disk being not in place, and exit the SMI program.

15. The non-transitory computer-readable storage medium according to claim 13, wherein the NVMe solid-state disk has a long signal pin, and after reading the input state value of the GPIO and the processing program, when executed by the processor, is configured to cause the processor to:
  in response to the input state value of the GPIO being a corresponding value about the NVMe solid-state disk in place, skip processing a plugged device by the SMI program, return from the SMI program to recover a saved current state, and continue to execute an INTx interrupt program, wherein
  the INTx interrupt program is generated in response to an in-place state of an in-place signal corresponding to the long signal pin changing.

16. The non-transitory computer-readable storage medium according to claim 13, wherein the processing program, when executed by the processor, is configured to cause the processor to:
  store, in a Central Processing Unit (CPU), a value of a register in a System Management RAM (SMRAM) before entering a System Management Mode (SMM), and jump to an SMI ENTRY POINT for execution.

17. The non-transitory computer-readable storage medium according to claim 13, wherein the SMI program is in a form of software interrupt.

* * * * *